United States Patent [19]

Beach

[11] 4,416,634

[45] Nov. 22, 1983

[54] DENTAL PRACTICE MEANS

[76] Inventor: Daryl R. Beach, 8-2, Wado-cho, Atami-shi, Shizuoka-Pref, Japan

[21] Appl. No.: 344,401

[22] Filed: Feb. 1, 1982

[51] Int. Cl.³ .............................................. G09B 23/28
[52] U.S. Cl. .................................... 434/263; 297/445; 312/209; 312/239
[58] Field of Search ....................... 434/263, 264, 432; 433/77, 78, 229; 297/157, 451, 445; 312/239, 209

[56] References Cited

U.S. PATENT DOCUMENTS

| | | | |
|---|---|---|---|
| 3,366,415 | 1/1968 | Cooper | 434/239 X |
| 3,524,256 | 8/1970 | Barker | 312/209 X |
| 4,311,467 | 1/1982 | Beach et al. | 434/264 |

*Primary Examiner*—William H. Grieb
*Attorney, Agent, or Firm*—Moonray Kojima

[57] ABSTRACT

This invention is concerned with a dental practice means having an improved construction wherein dental practice bases are lined up straight in rows to enable man's head models to be disposed at both sides of the means. The means is constructed in a smaller dimensions than the conventional ones, wherein instructors are able to fully communicate with their dental practice apprentices and observe the smallest motions of the apprentices' hands, and their way of using dental instruments. Further the dental practice apprentices are able to learn almost in the same manner as though they are practically making dental treatment to dental patients.

1 Claim, 4 Drawing Figures

DENTAL PRACTICE MEANS

BACKGROUND OF THE INVENTION

Hithereto use has been made of such dental practice means in the field of dental education system for example as means wherein a single practice chair is especially prepared for a dental student apprentice, which chair is provided at one side thereof with a man's head model and at both sides with syringes, a vacuum pump, handpieces and other necessary instruments.

According to the above-mentioned dental education system, a number of dental practice means must be positioned in rows to form a large area so that in case a great number of dental student apprentices are instructed at a time, an instructor is unable to confirm as to how exactly they are operating in accordance with his instructions. Furthermore, some of the apprentices remote from the instructor cannot acoustically follow him.

Thus in order to eliminate the foregoing disadvantages, a proposition has been made wherein dental practice means are placed opposite to one another so that all the means may be disposed in a straight line. However, according to the above-mentioned opposed positioned means, an instructor cannot sit on a chair in a fixed position, thus being unable to check each apprentice's way of holding an instrument, motion of his hands, and his operating posture. The result is that the instructor fails to communicate his own wishes to the apprentices.

STATEMENT OF OBJECTS

Accordingly, the present invention has been contrived to overcome all the above-mentioned drawbacks and disadvantages, having for one of its main objects the provision of a dental practice means which can be placed opposite to a counterpart means in a straight line, with platforms for instructors provided in the foremost ends lengthwise of said means, upon said platforms there being provided chairs for the instructors whereby two instructors for example sitting down on the chairs positioned higher than their dental student apprentices can exactly communicate to the latter with their own voice. Moreover, according to this system, the instructors can minutely observe how the apprentices are operating their hands, how they hold dental instruments and how they are using the same. Thus the dental student apprentices are also able to learn exactly how to make dental treatment within a short length of time.

Another object of the invention is to provide a dental practice means wherein an opening is formed at the side of a cabinet on the supporting base having a man's head model thereby partially forming a space for placing a kneading plate member. Thus the space can be effectively used by dental practice apprentices when they knead a filling material for rigidly fixing a crown and mixing medicines for protecting a dental pulp. Furthermore the apprentices can have their arms and hands prevented from moving to an extreme whereby their operating point is limited excessively to make an exact dental treatment is a stable seated posture.

Another object of the invention is to provide the construction of a dental practice means having an upper portion formed in a cone shape so that no object ban be placed thereon whereby dental practice apprentices can become accustomed to always placing instruments in fixed positions, and whereby along the highest line of the cone shaped upper portion there is mounted a substantially T shape light supporting member so that opposed two man's head models are each uniformly illuminated by a single light. By this arrangement, instructors are able to abserve the operating manner of their dental student apprentices with their field of vision bying intercepted.

A further object of the invention is to provide a dental practice means having a particular rotary chair which can rotate within a fixed range, with its rotational center located in a substantially vertical relation with respect to an oral cavity of each man's head model whereby the dental student apprentices are naturally able to get into the habit of moving subject to the oraval cavity of each patient in practical dental treatment.

A still object of the invention is to provide a particular rotary chair for dental practice means having a seating posture guide pole provided laterally in a middle portion of a back seat plate of the chair so adapted that when dental student apprentices seated on the chairs can straighten the line of their backbone, the guide pole gets in touch with the backbone of the apprentices to its uppermost portion. Thus if they do not feel their backbone touching the posture guide pole, they can learn their seating posture is not proper. By so learning physically their seating posture on the chair, they can get into the habit of operating in a right seated posture for a long length of time.

All the other objects, features and advantages of the dental practice mean in accordance with the present invention, will become apparent from the following detailed description of the invention in conjunction with the accompanying drawings.

DESCRIPTION OF INVENTION IN RELATION TO DRAWINGS

Figure 1:
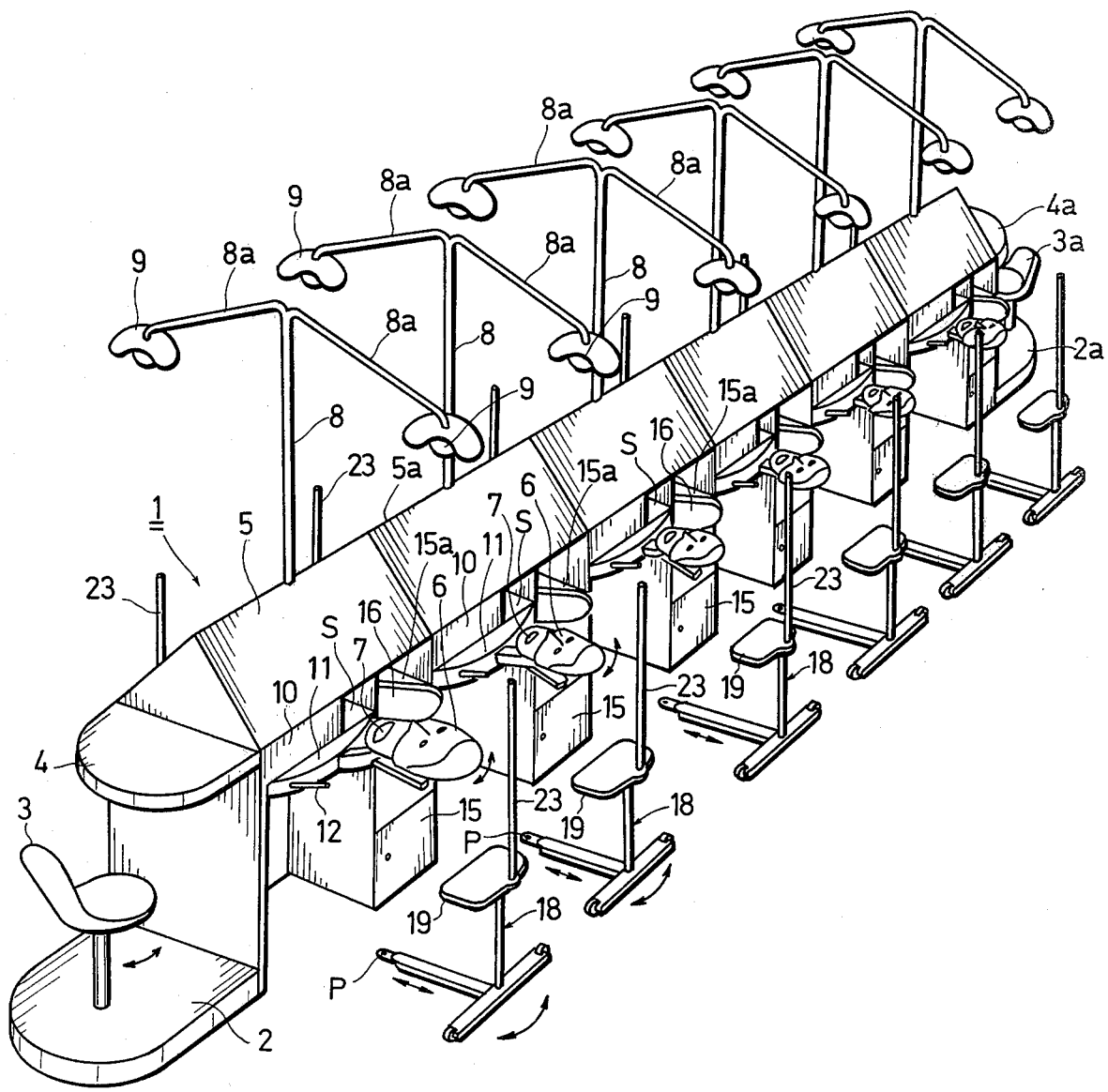
FIG. 1 is a perspective view showing as the whole a dental practice means carring out the invention.

In the accompanying drawings, numeral 1 generally designates a main body of the dental practice means 1 carrying out the invention. The practice means 1 comprises an opposed dental practice chairs connected in a straight line to each other. The main body or dental practice means 1 is provided in both end lengthwise thereof with platforms 2, 2a for instructors which are positioned higher than a floor. On platforms 2, 2a there are rigidly fixed rotary chairs 3, 3a for the instructors. On the upper part 5 of platforms 2, 2a there are mounted circumferentially semi-circular tables, 4, 4a.

The upper part 5 of dental practice means 1 is formed higher in its middle partion from which said part 5 is downwarly inclined towards its both ends with respect to cross section thereby to form an equilateral triangle. Along both sides of upper partt 5 there are placed a plurality of opposed man's head models 6 at equally spaced apart intervals.

On the highest line 5a of upper part 5 there are provided a number of light supporting members 8 corresponding to the number of models 6. The uppermost portion of light supporting members 8 are divided into two light supporting elements 8a in opposite relation, with a light 9 mounted at each end of said elements 8a.

Inasmuch as light supporting members 8 are provided along the highest line of the upper part 5 of the dental practice means 1 as has been mentioned above, instructors are able to observe their dental practice apprentices in the field of their vision. Moreover, by this arrangement, opposite two man's head models 6 can each be uniformly illuminated by means of a single light supporting members 8.

Figure 2:
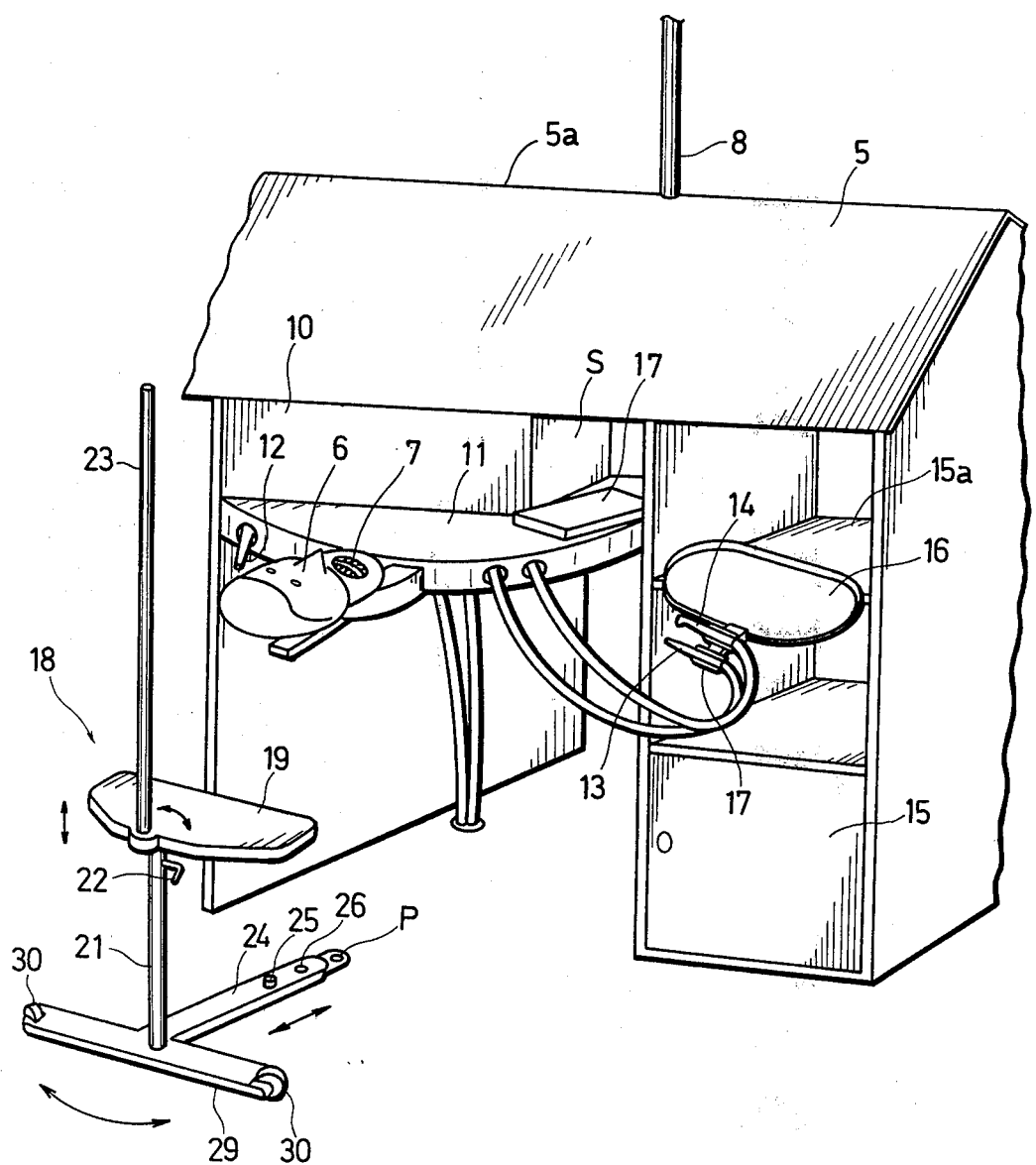
FIG. 2 is a partially enlarged perspective view thereof.

Each of man's head models 6 is supported in vertically movable and fixable relation within a fixed range on the middle portion of a supporting pole 11 which has an horizontal upper surface projected in an arc shape from both sides of upper vertical wall 10 of dental practice means 1. At the left hand side of supporting pole 11 there is received a vacuum pump 12 in drawable relation while the right hand side has handpieces 13, 14 one of which is adapted for high speed operation and the other for lower speed operation as shown in FIG. 2.

At the right hand side of man's head model 6 there is provided a container 15 having a door, an uppermost shelf 15a of which is adapted for placing a dental tray 16 having an edge to which there is righly fixed a handpiece retaining means 17 formed a notch on the upper portion and the downportion thereof. The handpiece retaining means 17 is adapted to permit handpieces 13, 14 to be insertible.

At the side of container 15 on the upper portion off said supporting pole 11 there is formed a space S inwardly by cutting vertical wall 10 so as to provide a place for receiving a kneading plate 17 whereon a filling material or medicines for protecting the dental pul can be kneaded. In each position corresponding to man's head models 6 there are suitably positioned chairs 18 for dental practice apprentices. The rotational center P of each said chairs 18 is pivotally supported in a vertically lower position of each man's head model 6. The chair 18 has a seat plate 19 whose lower supporting pole 21 is provided with an adjusting lever 22 vertically movable so as to vertically move the seat plate 19 subject to the length of legs of a dental student apprentice seated thereon.

Figure 4:
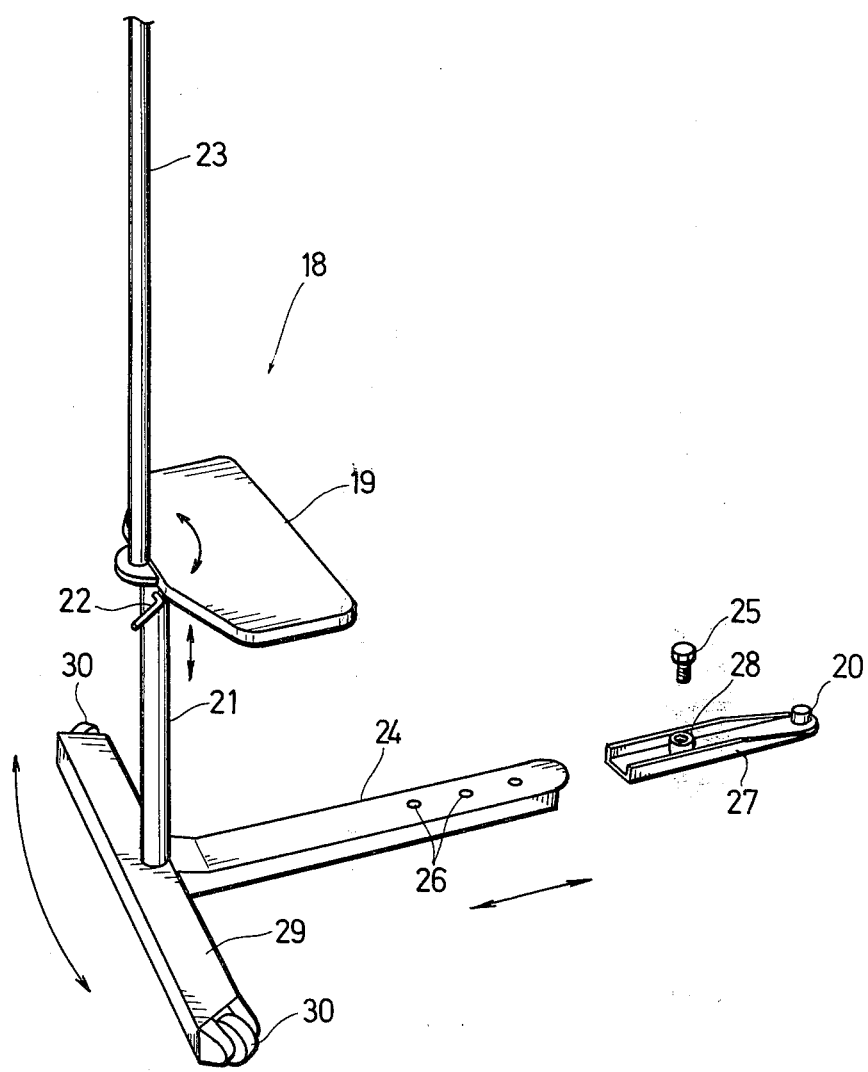
FIG. 4 is a broken perspective view thereof.

From the middle back seat portion of seat plate 19 there is erected a guide pole 23 adapted to guide a seated apprentice to keep him in a proper seated posture. Further chair 18 for a dental student apprentice has a connecting pole 24 which is bored with a plurality of holes 26 at suitably spaced apart intervals for receiving bolts 25 so as to permit a seated apprentice to movably fix with respect to the pivoting point below the oral cavity of the man's head model just in the position of his legs most suitable to the pivoting point. In this position bolts 25 inserted into the hole 26 is screwably fixed in a screw hole 28 formed on a base 27 pivotally mounted on the pivoting point as shown in FIG. 4.

In both ends of a lateral leg member 29 connected across to connecting leg member 24 there are mounted casters 30 inclined in rotatable direction, thus every dental student apprentice is able to learn how to move in limited plate with a model's oral cavity as its center as if they were practically treating a dental patient.

In case of dentally practing treatment, every dental student apprentice sits on the rotary chair 18 mounted corresponding to the man's head model and adjustably fixes the height of the seat plate 19 in the most suitable positions of their legs to the seat plate 19 and to the rotational center P of the rotary chair 18. Then two dental instructors sit on the chairs 3, 3a, respectively on the platforms 2, 2a wherein the instructor seated on the chair 3 at the left hand side with respect to FIG. 1 observes a group of apprentices at his side from the platform 2 positioned higher than them while the other instructor seated on the chair 3a at the right hand side with respect to FIG. 1 observes another group of apprentices at his side on the platform 2a likewise positioned higher than the latter group, thus both of them being able to carefully observe how the two groups are operating their hands and using dental instruments.

The instructors may place on the tables 4 all necessary books and dental instruments, giving instructions to the groups or may be able to practically show them how exactly to use the dental instruments as occasions need.

As has been clearly understood from the foregoing description of the invention, the dental instructors are positioned higher than the dental student apprentices so that they can exactly give their instructions to the dental student apprentices in their audible voice and also confirm the smallest motion of the apprentices' hands and their manners of using dental instruments.

Figure 3:
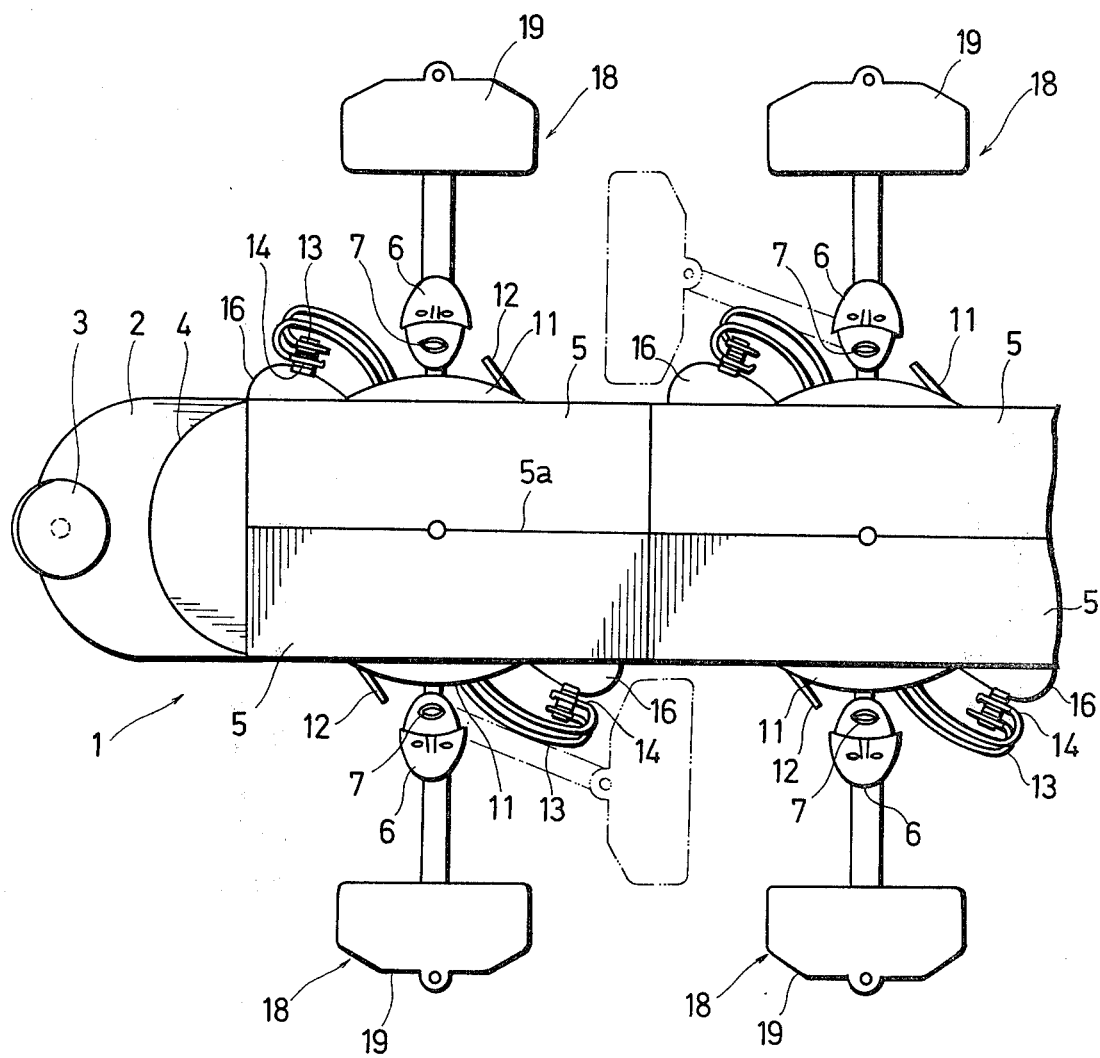
FIG. 3 is a partially cutaway plan view thereof.

In case use is made of the dental practice means 1 in accordance with the invention to give dental instructions to both the dental student apprentices and dental practice assistants, the chair 18 for the apprentice shown by an supposed straight line at the left hand side with respect to FIG. 3 is moved to the man's head model 6 which is positioned at the other side so as to enable the assistant to use the model 6, thus making it possible for both the apprentices and the assistants to make use of the model 6.

What is claimed is:
1. An assembly for training concurrently one or more dental trainees, comprising, in combination,
a plurality of pairs of training stations positioned on a floor and connected to each other in an extended straight line with two ends, each pair having face-to-face seating positions for a pair of said dental trainees;
a table positioned on each of said ends of said line of connected plurality of stations for use by instructors;
a platform raised above said floor at a predetermined height and disposed at each of said ends; and
a horizontally and vertically movable chair attached by support base to said platform at each end, for seating said instructor at a suitable level for unobstructed observation of said trainee and hands of said trainees; and wherein
each of said stations comprises
a sloping top for each pair of stations thereby to form, in cross section, a triangle, whereby said sloping tops extend continuously from one end of said line to the other end of said line;
each pair of stations having connected at the top of said sloping top, a vertical support means with a pair of horizontal support means extending therefrom at the top of said vertical support means and in opposing directions, and light means at the end of each horizontal support means, said horizontal and vertical support means disposed so that said light means is positioned above a position holding a patient's head sample;

a support table for holding said patient's head sample, said supporting table holding means for supplying vacuum or other power directing means;

a shelf extending between each of a pair of stations;

a section shelf disposed to the right of said supporting table;

a dental tray held adjacent said head sample and on said second shelf;

a plurality of cabinets disposed below said second shelf, for holding one or more dental tools;

a chair for holding said trainee to be within easy working area of said sample head, said chair comprising a T shaped base, having one end of a leg of said T, rotatably connected to said floor, and a top bar of said T having wheels connected at the ends thereof, whereby said chair is rotatable about said connected leg end so that said dental trainee is within a prescribed work area of said head sample at all times, and said chair further comprising a vertical base support connected to said T support base, a seat connected to said vertical base support, and a vertically extending rod connected to said seat at the back thereof and toward the middle thereof, whereby a dental trainee has a constant check on his posture by contact of his back against said vertically extending rod; whereby the entire assembly has suitable positioning of all components thereof so that said instructor can readily observe without any substantial obstruction, said dental trainees and their hands.

* * * * *